No. 796,400. PATENTED AUG. 1, 1905.
F. H. BOWLY.
TIRE.
APPLICATION FILED JULY 26, 1904.
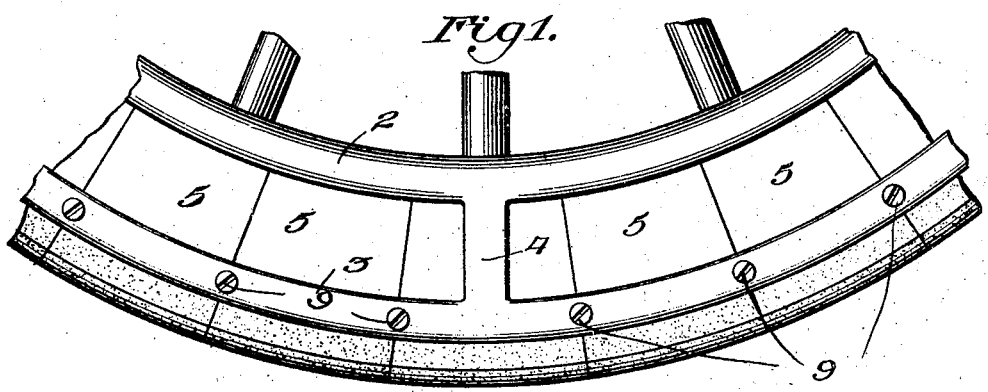
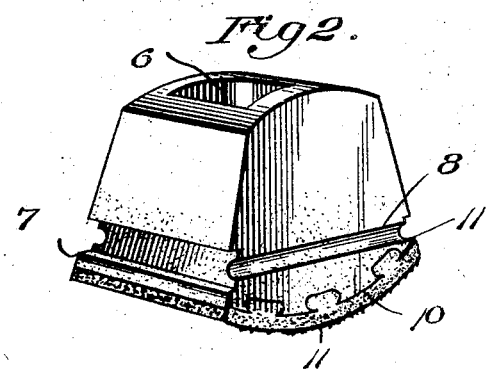
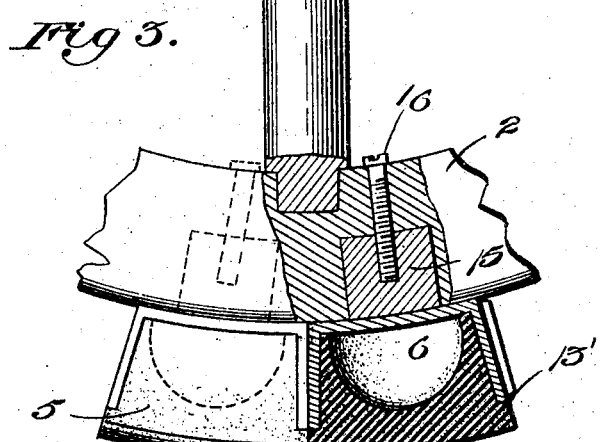
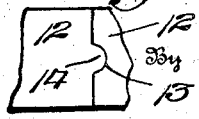
Witnesses
Phil E. Barnes.
W. H. Clarke.
Inventor
Franklin H. Bowly
By Victor J. Evans
Attorney

UNITED STATES PATENT OFFICE.

FRANKLIN H. BOWLY, OF NEW YORK, N. Y.

TIRE.

No. 796,400.  Specification of Letters Patent.  Patented Aug. 1, 1905.

Application filed July 26, 1904. Serial No. 218,246.

*To all whom it may concern:*

Be it known that I, FRANKLIN H. BOWLY, a citizen of the United States, residing at New York city, in the county of New York and State of New York, have invented new and useful Improvements in Tires, of which the following is a specification.

This invention relates to sectional tires.

One object of the invention is to produce a tire which after it shall have become worn will present a rough tread-surface suitable for use upon ice or slippery ground.

A further object of the invention is to improve the construction of sectional tires in such manner that the separate sections thereof may be removed readily and replaced by others when they become unfit for further use.

With the foregoing and other minor objects in view, which will appear as the description proceeds, the invention resides in a tire having a tread-surface comprising in its composition a plurality of materials of different degrees of toughness, whereby the softer material will wear away and leave the tougher material to form a roughened surface.

The invention also resides in a wheel having a plurality of tire-sections attached in a novel manner to its periphery, each section being made of a mass of yielding material in which is embedded a plurality of ribs formed integral upon a facing comprising in its composition a plurality of materials of different degrees of hardness.

Furthermore, the invention resides in the particular combination and arrangement of parts and in the precise details of construction hereinafter described and claimed as a particular embodiment of the invention.

In the accompanying drawings, forming a part of this specification, Figure 1 is a side elevation showing a wheel rim and tire constructed in correspondence with the invention. Fig. 2 is a perspective view of one of the segmental sections of which the improved tire is made. Fig. 3 is a view, partly in elevation and partly in section, showing a different form of the invention. Fig. 4 is a diagrammatic view showing the tongue-and-groove connection between the cups.

Like reference-numerals indicate corresponding parts in the different views.

Referring to Fig. 1, the numeral 2 designates a wheel-rim having a pair of attaching-rings 3, connected therewith by braces 4, disposed at intervals around the periphery of the wheel, it being understood that one of the attaching-rings 3 is disposed on each side of the wheel. The attaching-rings 3 serve to hold in position a plurality of segmental sections 5, which combine to produce the complete tire. As shown in Fig. 2, each of the sections 5 is contracted toward its lower end in order to facilitate its introduction between the attaching-rings 3. Each of the sections 5 is formed, preferably, of rubber or other suitable yielding material and is formed with an air-chamber 6. A groove, such as 7, is formed in each side of each section 5 to receive one of the attaching-rings 3 after the section has been forced into position between said attaching-rings 3, it being understood that the yielding quality of each section permits it to be compressed and inserted between the attaching-rings, after which it will expand and be held in position by reason of the fact that the attaching-rings fit into the grooves 7. Each section 5 is also formed in opposite sides with transverse semi-cylindrical grooves 8. When the sections 5 are in place, the transverse grooves 8 of two adjacent sections register to form a single tubular passage, through which extends a screw or bolt, such as 9, connecting the two attaching-rings 3. Connected with each of the sections 5 in any suitable manner is a facing, such as 10. It is preferable to connect the facing 10 with the section 5 by means of ribs 11, which are formed integral upon the facing and are embedded in the yielding material of the section. The facing 10 of each segmental section 5 preferably comprises in its composition a plurality of materials of different degrees of toughness, whereby the softer material will wear away and leave the tough material to form a roughened tread-surface for the wheel. As a more specific disclosure of the invention it may be stated that the facing or tread-surface 10 can consist of two metals of different degrees of hardness—such as steel and iron, or steel and aluminium, or iron and emery—fused or melted together in any suitable manner, or else the facing may contain hard sand or grit or be formed of rubber which has been mixed while in a soft condition or plastic state with emery, sand, or other suitable material or metallic substance—as, for instance, granulated steel or steel filings. It will be apparent that after the wheel has been used for a while the softer material of which the facing or tread-surface is composed will wear away and leave the harder or tougher material to form a roughened surface. In constructing a section such as shown in Fig. 2 it is preferable, first, to mold the facing 10 with integral ribs 11, having overhanging head portions, as shown, and, second, to work the plastic rubber or yielding material of which the section is composed into the mold containing the facing 10, whereby the ribs of the facing are firmly embedded in the rubber or other similar yielding material.

Referring to Fig. 3, it will be understood that each section 5 is formed in a manner similar to the sections shown in Fig. 1, excepting that the grooves 7 and 8 are omitted—that is to say, each section 5 in Fig. 3 comprises a mass of yielding material having therein an air-chamber 6 and, further, having embedded therein the ribs of a metallic facing comprising in its composition a plurality of materials of different degrees of toughness. It will be understood in this connection, however, that, if desired, the metallic facing or tread-surface may in some cases be omitted, leaving only the section composed of yielding material. In the construction shown in Fig. 3 each of the sections 5 is placed in a metallic cup, such as 12, each section projecting downwardly from the cup in which it is mounted and extending over the rim of said cup, as shown at 13'. Each of the cups 12 is formed on one side with a groove 13, as shown in Fig. 4, and on the opposite side with a tongue or rib 14. It will be understood that when the cups 12 are placed upon the rim of the wheel the tongue on one cup will fit into the groove of the adjacent cup, whereby any turning movement or lateral displacement of one cup with respect to the others will be avoided. Each of the cups 12 is formed with a shank 15, which projects into a suitable socket in the wheel-rim 2 and is held in place by means of a screw or bolt 16 extending through said rim.

A tire constructed in accordance with this invention possesses the quality of firmness or toughness of tread-surface, combined with a yielding quality due to the material of which each section is formed and to the air-chamber contained within each section. For this reason while the tire will yield sufficiently to give the desired resiliency it will not be punctured or torn by coming in contact with sharp objects, such as stones or glass. When the section becomes worn or injured at any time, it may be replaced easily and quickly with a new section, whereby the life of the wheel as a whole is greatly prolonged.

Changes in the precise embodiment of the invention illustrated and described may be made within the scope of the following claims without departing from the spirit of the invention or sacrificing any of its advantages.

Having thus described the invention, what is claimed as new, and desired to be secured by Letters Patent, is—

1. A tire composed of yielding material having a metallic facing comprising in its composition a plurality of materials of different degrees of toughness, said facing being attached to the yielding material and forming the tread-surface thereof.

2. A wheel-rim having a pair of attaching-rings, braces disposed at intervals around the wheel-rim and connecting the rings thereto, and a plurality of segmental sections having inclined sides formed with grooves to receive the attaching-rings, said sections being forced between the attaching-rings.

3. As a new article of manufacture, a segmental tire-section composed of yielding material, and a metallic facing comprising in its composition a plurality of materials of different degrees of toughness, said facing being attached to the segmental section and forming the tread-surface thereof.

4. As a new article of manufacture a segmental tire-section composed of yielding material and a facing comprising in its composition a plurality of materials of different degress of toughness, said facing having a plurality of ribs formed with overhanging head portions embedded in the yielding material of the segmental section.

In testimony whereof I affix my signature in presence of two witnesses.

FRANKLIN H. BOWLY.

Witnesses:
    EDWARD R. LEGAN,
    CHARLES T. LEAR.